United States Patent [19]

Bukoschek et al.

[11] Patent Number: 4,920,761
[45] Date of Patent: May 1, 1990

[54] ICE-CREAM MAKER

[75] Inventors: Romuald L. Bukoschek, Klagenfurt; Wolfgang Ramusch, Brückl/Kärnten, both of Austria; Johann Schröder, Aachen, Fed. Rep. of Germany

[73] Assignee: U.S. Philips Corp., New York, N.Y.

[21] Appl. No.: 877,653

[22] Filed: Jun. 23, 1986

[30] Foreign Application Priority Data

Jun. 26, 1985 [AT] Austria .................. A1903/85

[51] Int. Cl.⁵ .................................................. A23G 9/00
[52] U.S. Cl. .......................................... 62/342; 62/529
[58] Field of Search ............. 62/342, 343, 529, 372; 220/408

[56] References Cited

U.S. PATENT DOCUMENTS

| | | | |
|---|---|---|---|
| 298,340 | 5/1884 | Berghofer | 220/408 X |
| 342,397 | 5/1886 | Smith | 220/408 X |
| 1,330,868 | 2/1920 | Harrison | 220/408 X |
| 1,406,399 | 2/1922 | Lumby | 220/408 |
| 3,241,706 | 3/1966 | Monaco et al. | 220/408 X |
| 3,922,879 | 12/1975 | Arnold | 62/529 X |
| 3,971,360 | 7/1976 | Spoeth, Jr. | 220/408 X |
| 4,205,535 | 6/1980 | Maurer | 62/529 X |

Primary Examiner—William E. Tapolcai
Attorney, Agent, or Firm—Ernestine C. Bartlett

[57] ABSTRACT

An ice-cream maker having a cylindrical container, into which a discoid cold cartridge is insertable, and an electric motor, through a gear unit, drives a shaft located in the container. The shaft includes a scraper and stirrer tool acting at least together with the cold cartridge. The cold cartridge is provided, around its circumference, with a continuous, outwardly projecting edge and the container interior wall is provided, around its circumference, with a corresponding step extending into the inside of the container. A cold cartridge inserted into the ice-cream maker lodges its projecting edge on this step and at least the bottom wall of the cold cartridge is located at a distance from the container wall.

7 Claims, 2 Drawing Sheets

ICE-CREAM MAKER

BACKGROUND OF THE INVENTION

The invention relates to an ice-cream maker with a cylindrical container into which a discoid cold cartridge is insertable. An electric motor, through a gear unit drives a shaft running central to the container. On the shaft, a scraper and stirrer tool is located and acts with the cold cartridge. This kind of ice-cream maker which is used as a domestic appliance is known from DE-OS 28 31 592. In this known ice-cream maker the cold cartridge rests on the base of the container, whereby its peripheral surface lies at a slight distance from the peripheral area of the container in order to permit insertion and removal of the cold cartridge. There is thus a free space around the cold cartridge separating it from the container, which is filled with the ice-cream mixture when this is poured in and then freezes around the cold cartridge. As a result the cold cartridge cannot easily be extracted from the container. The resting of the cold cartridge on the base of the container may also result in changes in the distance from the scraper and stirrer tool due to the different heights of the cold cartridge, which might impair the scraping of the ice-cream forming on the walls of cold cartridge.

SUMMARY OF THE INVENTION

The object of the invention is to improve an ice-cream maker of the above present type with regard to its manner of operation and to remove the above disadvantages. This object is achieved according to the present invention by providing a cold cartridge around its circumference with a continuous outwardly projecting edging and the container is provided around its circumference with a corresponding stepping projecting into the inside of the container, on which the cold cartridge inserted into the ice-cream maker lodges its projecting edging. At least the bottom wall of the cold cartridge is located at a distance from the container. In this manner the projecting edging on the cold cartridge together with the stepping around the circumference of the container seals off the free space below the outwardly projecting edge between the cold cartridge and the container. Practically no ice-cream mixture can penetrate into this free space. Such a sealing is also favoured by the ice-cream mixture freezing around the projecting edging of the cold cartridge and thus sealing off the access to the free space between the cold cartridge and the container. This free space thus no longer has any adverse influence, nor is the dimensioning of the cold cartridge diameter critical any longer. The circumferential stepping on the container is provided at such a level that the wall of the cold cartridge facing away from the scraper and stirrer tool is at a distance from the container. A free space is also provided at the base of the container so that the dimensioning of the cartridge regarding its height is no longer critical, additionally the wall of the cold cartridge facing the scraper and stirrer tool is invariably at the same level, and there are thus no changes in the distance from the scraper and stirrer tool, therefore ensuring efficient interaction of the scraper and stirrer tool with the cold cartridge. Such a free space at the bottom also permits changes in volume of the cold cartridge which may occur according to its temperature.

It is advantageous for the cold cartridge to be formed from at least two parts joined together. One part consists of the wall facing the scraper and stirrer tool and the other part of a trough-shaped base. The projecting edging is provided in the area where these two parts join. In this way the projecting edge can be formed very simply during the course of the manufacture of the cold cartridge. Furthermore, almost the whole volume of the cold cartridge lies below the projecting edge, with the stepping provided around the circumference of the container, provides a good sealing of the free space between cold cartridge and container.

There are various possibilities for the joining of the two parts of the cold cartridge and the design of the projecting edging. It is thus possible, for the trough-shaped base to have a smaller external diameter than the wall facing the scraper and stirrer tool, whereby the wall is then placed on the base and is welded to the latter. The section of the wall facing the stirrer and scraper tool which projects above the base then directly forms the projecting edge of the cold cartridge. For particularly simple manufacture and secure joining of the two parts it is advantageous to have the trough-shaped base with an upper edge angled outwards which abuts against the wall of the cold cartridge facing the scraper and stirrer tool, and these two parts to be joined together in the area of their circumferential edges. In this manner, the two parts abut securely against one another and can thus be joined well together.

It is simple and suitable for the two parts of the cold cartridge to be joined together by a weld.

The two parts can also be joined together simply by a fold, or by means of a clamping ring with a U-shaped cross section.

In this context it is advantageous for the wall of the cold cartridge facing the scraper and stirrer tool to have around its circumference a groove facing the base, into which the angled upper edge of the base engages and the joining of the two parts occurs by means of a clamping ring inserted into the groove and gripping over the angled edge of the base. In this manner a particularly secure and simply manufactured joining of the two parts is obtained.

To form the projecting edge on the cold cartridge a ring can be raised on the circumferential wall of the cold cartridge. In this manner, the cold cartridge as such may be completed initially and the projecting edge subsequently formed on it.

The projecting edge on the cold cartridge can be constituted by a U-shaped compression of the circumferential wall of the cold cartridge. In this way the projecting edging may be shaped out directly on the cold cartridge.

The invention further relates to a cold cartridge for an ice-cream maker as described above. According to the invention the cold cartridge has a continuous protecting edging around its circumference.

The invention will be described in further detail with reference to the drawings, which show several embodiments of the invention, to which it should not however, be restricted.

DESCRIPTION OF THE PREFERRED EMBODIMENT

Figure 1:
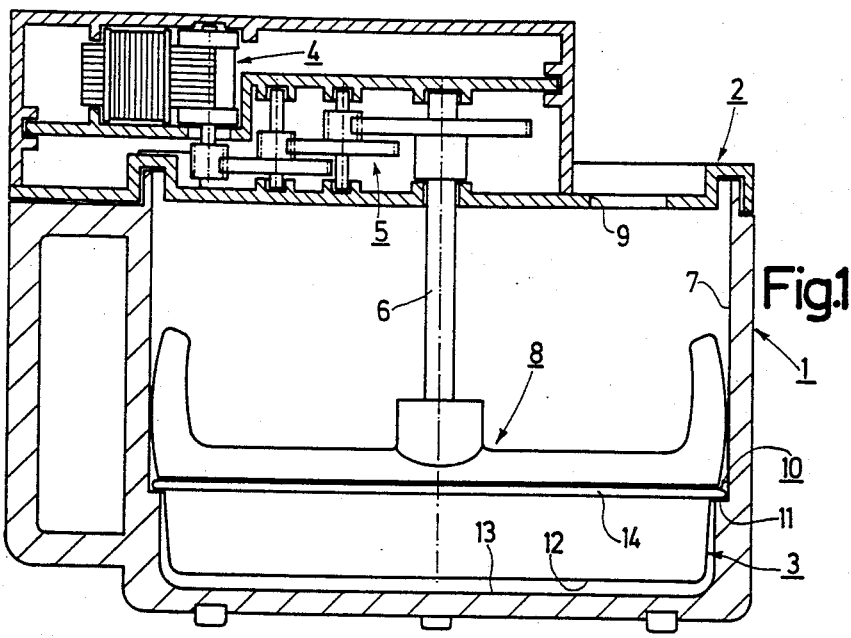
FIG. 1 shows an ice-cream maker according to the present invention, partially in section in side elevation.

In FIG. 1 a thermally insulated cylindrical container 1, sealed by means of a cover 2. The cover 2 can be secured in position on the container by means of the usual locking mechanisms which are not shown here. A discoid cold cartridge 3 is inserted into the container 1 which contains a latent heat storage medium. The cover 2 accommodates an electric motor 4, which through a gear unit 5, in form of a three-step toothed-wheel gearing drives a shaft 6 located centrally in the container 1. The shaft includes a scraper and stirrer tool 8 acting together with the cold cartridge 3 and the container wall 7. If required, the electric motor 4 may constitute constitute an assembly separable from the lid 2, together with the gear unit. The shaft 6 may also be releasable from the gear unit along with the scraper and stirrer tool by means of a plug connection. A spring arrangement may be provided between the gear 5 and the shaft 6, which keeps the scraper and stirrer tool under spring pressure against the cold cartridge 3, so as to permit the scraping of ice-cream forming on the cold cartridge as efficiently as possible.

Before the use of the ice-cream maker the cold cartridge 3 is cooled, such as in the freezer compartment of a refrigerator, and subsequently inserted into the container 1. The cover 2 with the scraper and stirrer tool 8 is then placed onto the container 1. Then an ice-cream mixture is poured into the filling opening 9 provided in the cover 2. After switching on the electric motor 4, the scraper and stirrer tool 8 begins to turn, whereby the ice-cream mixture is mixed and any ice-cream forming on the cold cartridge is scraped off and mixed back into the ice-cream mixture. This continues until only ice-cream with the required temperature and consistency remains.

In an ice-cream maker of the present invention, the cold cartridge 3 is provided around its circumference with a continuous projecting edge 10 and the container 1 around its circumference with a stepping 11 projecting into the inside of the container, on which a cold cartridge 3 inserted into the ice-cream maker lodges on its projecting edge 10. The wall 12, of the cold cartridge 3, facing away from the scraper and stirrer tool 8, has a distance from the base 13 of the container 1. By resting the continuous projecting edge 10 of cold cartridge 3 on the stepping 11 of container 1, the free space below the edge 10 between the cold cartridge 3 and the container 1 is sealed off so that practically no ice-cream mixture can penetrate into this free space and freeze there onto the cold cartridge 3. Such a sealing is also favoured by the ice-cream mixture freezing around the projecting edge 10 and thus sealing off the access to the free space between the cold cartridge 3 and the container 1 even more efficiently. There is thus the possibility of making this free space large enough to ensure that tolerances in the dimensions of the cold cartridge, both in respect of the circumference and the height, can no longer have a perceivably detrimental effect when inserting a cold cartridge into the container or extracting it from the latter. This free space also provides the possibility of compensating for changes in volume of the cold cartridge which may result from changes in its temperature. Due to the fact that it is now the edge 10 of the cold cartridge 3 in conjunction with the stepping 11 on container 1 which determines the distance of the wall of the cold cartridge facing the scraper and stirrer tool from the scraper and stirrer tool, dimensional tolerances in the height of the cold cartridge can no longer have a perceivably detrimental effect regarding interaction with the scraper and stirrer tool. An efficient scraping off of any ice-cream forming on the cold cartridge is ensured. In this context and in order to render the sealing as effective as possible, it is most suitable for the projecting edge 10 to lie as close as possible to the wall 14 of the cold cartridge facing the scraper and stirrer tool 8.

There are various possibilities for the design of such a projecting edge of a cold cartridge, which are shown in detail in FIGS. 2 to 8.

Figure 2:
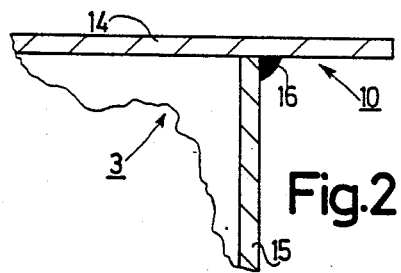
FIG. 2 shows in detail the design of a projecting edge directly constituted by the section of a wall of a cold cartridge consisting of two parts.

FIG. 2 shows a cold cartridge consisting of two parts. One part consists of the wall 14 facing the scraper and stirrer tool and the other part of a trough-shaped base 15. The discoid wall 14 has a larger external diameter than the base 15, as a result of which, when the wall rests on the base 15, a continuous projecting edging 10 is formed, which is directly constituted by a section of the wall 14. The joining of the wall 14 to the base 15 is constituted in this case by a welded seam 16. If required, it is also possible for the base 15 to be composed of two parts.

Figure 3:
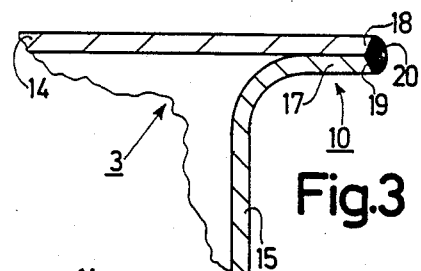
FIG. 3 shows in detail the design of a projecting edge of a cold cartridge consisting of two parts, with the base having an upper edge angled outwards which abuts against the wall of the cold cartridge facing the stirrer and scraper tool and the joining of the two parts is by means of a weld.

In the embodiment according to FIG. 3, the trough-shaped base 15 has an upper edge 17 angled outwardly on which the wall 14 of the cold cartridge facing the scraper and stirrer tool rests. These two parts are then joined together in the area of this circumferential edges 18 and 19. In this particular embodiment, this connection is formed by a welded seam 20. As can be seen, the projecting edge 10 is constituted by sections of the wall 14 abutting against each other and the angled edge 17.

Figure 4:
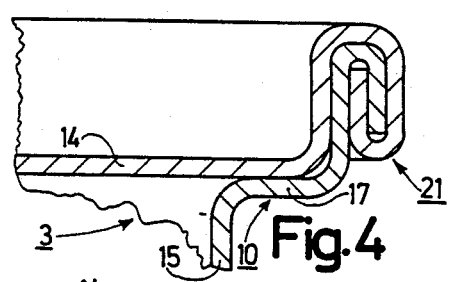
FIG. 4 shows for a design of the projecting edge according to the FIG. 3 the joining of the two parts by a fold.

In the embodiment according to FIG. 4, the joining of the two parts 14 and 17 is by means of a fold 21.

Figure 5:
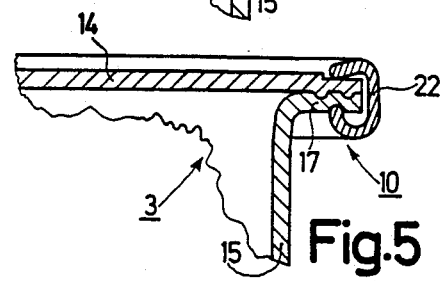
FIG. 5 shows a design of the projecting edge according to FIG. 3 the joining of the two parts by means of a clamping ring with a U-shaped cross section.

In the embodiment according to FIG. 5, a clamping ring 22 with a U-shaped cross section is provided for the joining of the two parts 14 and 17. To ensure that this joining is perfectly tight, the abutting surfaces are provided with corresponding, annular, engaging projections/recesses in the manner of a labyrinth seal. When the cold cartridge is inserted into the ice-cream maker, the clamping ring 22 then lies on the stepping 11 of the container 1. If required, the stepping 11 may also be provided with a groove which renders the clamping ring 22 superfluous, so that the angled edge 17 lies on the stepping 11.

Figure 6:
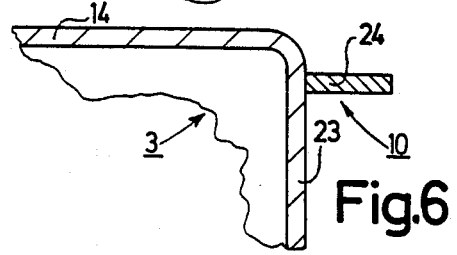
FIG. 6 shows in detail an embodiment in which the projecting edge provided on the cold cartridge is formed by means of a ring raised around the circumference of the cold cartridge.

As FIG. 6 shows, the projecting edge 10 is formed in this embodiment by a ring 24 raised on the circumferential wall 23 of the cold cartridge.

Figure 7:
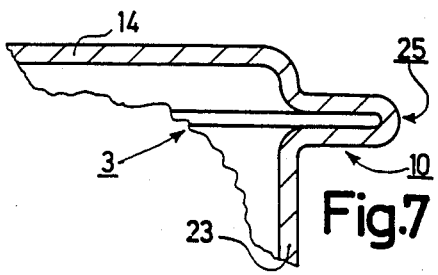
FIG. 7 shows in detail an embodiment in which the projecting edge on the cold cartridge is formed by a U-shaped compression of the circumferential wall of the cold cartridge.

In the embodiment according to FIG. 7, the projecting edging 10 provided on the cold cartridge is formed by a U-shaped compression 25 of the circumferential wall 23 of the cold cartridge.

Figure 8:
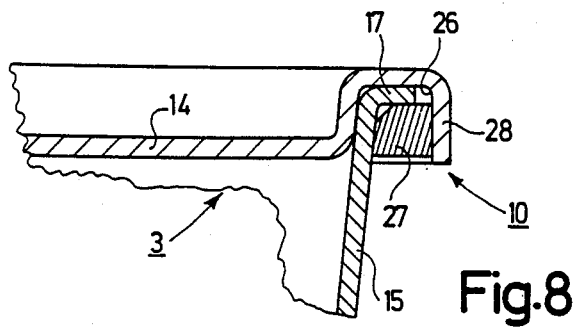
FIG. 8 shows a design of the projecting edge according to FIG. 3 with the joining of the two parts by means of a clamping ring with a circular cross section, which is inserted into a groove on the wall facing the scraper and stirrer tool and thereby grips over the angled edge of the base section.

As FIG. 8 shows, in this embodiment the wall 14 facing the scraper and stirrer tool is provided around its circumference with a groove 26 into which the angled upper edge 17 of the trough-shaped base 15 engages. A clamping ring 27 is inserted into this groove 26, gripping over this angled edge 17, as a result of which parts 14 and 17 are joined securely together. The projecting edge 10 is in this case formed by the section 28 of the wall 14 bordering the groove 26.

As is shown, there are a series of variations for the design of the projecting edge on the cold cartridge, without departing from the scope of the invention.

What is claimed is:

1. An ice-cream maker comprising:
 a cylindrical container;
 a discoid cold cartridge insertable into said container residing near the bottom of said container;
 a holding and sealing arrangement including a continuous outwardly extending edge provided around the circumference of said cold cartridge and a corresponding step in the wall of said container extending inside said container, around its circumference supporting a top wall of said discoid cold cartridge at a fixed vertical position, and for holding said cartridge inserted into said container at a distance from a bottom wall of said container, whereby a small free space is formed between at least a bottom wall of said cold cartridge and the bottom wall of said container permitting expansion and contraction of said bottom wall without changing said vertical position of said top wall, said arrangement sealingly closing said space to prevent leakage of any ice-cream mixture into said space;
 a shaft located centrally in said container supported above said cold cartridge;
 an electric motor driving said shaft through a gear unit; and
 a scraper and stirrer tool located on said shaft and biased against said top wall of said cold cartridge for scraping the top of said cold cartridge.

2. An ice-cream maker according to claim 1, wherein said cold cartridge is formed of at least two parts joined together, one part including said top wall facing said scraper and stirrer tool and the other part including a trough-shaped base, said outwardly extending edge being formed in the area of the joint of said two parts.

3. An ice-cream maker according to claim 2, wherein said trough-shaped base has an upper edge angled outwardly to abut against the wall of the cold cartridge, said two parts being joined in the area of their circumferential edges.

4. An ice-cream maker according to claim 3, wherein said two parts are joined together by welding.

5. An ice-cream maker according to claim 3, wherein the joining of the two parts is by means of a fold.

6. An ice-cream maker according to claim 3, wherein the joining of the two parts is by means of a clamping ring with a U-shaped cross section.

7. An ice-cream maker according to claim 3, wherein the wall of the cold cartridge facing the scraper and stirrer tool has around its circumference a groove facing the base into which the angled upper edge of the base engages and the joining of the two parts occurs by means of a clamping ring inserted into the groove and gripping over the angled edge of the base.

* * * * *